United States Patent
Aoki et al.

(10) Patent No.: US 7,218,819 B2
(45) Date of Patent: May 15, 2007

(54) ELECTRODE SYSTEMS FOR OPTICAL MODULATION AND OPTICAL MODULATORS

(75) Inventors: Kenji Aoki, Ogaki (JP); Osamu Mitomi, Nagoya (JP); Jungo Kondo, Nishikamo-gun (JP); Atsuo Kondo, Okazaki (JP)

(73) Assignee: NGK Insulators, Ltd., Nagoya (JP)

( * ) Notice: Subject to any disclaimer, the term of this patent is extended or adjusted under 35 U.S.C. 154(b) by 113 days.

(21) Appl. No.: 10/740,850

(22) Filed: Dec. 22, 2003

(65) Prior Publication Data

US 2004/0136655 A1 Jul. 15, 2004

(30) Foreign Application Priority Data

Jan. 14, 2003 (JP) ............... 2003-005291

(51) Int. Cl.
G02B 6/26 (2006.01)
G02F 1/035 (2006.01)

(52) U.S. Cl. ............................................ 385/40; 385/2

(58) Field of Classification Search .................... 385/2, 385/3, 8, 9, 40, 41
See application file for complete search history.

(56) References Cited

U.S. PATENT DOCUMENTS

| | | | |
|---|---|---|---|
| 4,917,451 A * | 4/1990 | Chouinard et al. ............ | 385/2 |
| 5,138,480 A | 8/1992 | Dolfi et al. | |
| 5,764,822 A * | 6/1998 | Madabhushi ................ | 385/14 |
| 6,219,469 B1 | 4/2001 | Minakata et al. | |
| 6,304,685 B1 * | 10/2001 | Burns ............................ | 385/3 |
| 6,721,085 B2 * | 4/2004 | Sugiyama et al. .......... | 359/322 |
| 7,035,485 B2 * | 4/2006 | Kondo et al. .................. | 385/2 |
| 7,068,863 B2 * | 6/2006 | Kondo et al. .................. | 385/2 |
| 2002/0126932 A1 | 9/2002 | Minakata et al. | |
| 2002/0159738 A1 | 10/2002 | Aoki et al. | |
| 2003/0044100 A1 | 3/2003 | Kondo et al. | |

FOREIGN PATENT DOCUMENTS

| | | | |
|---|---|---|---|
| EP | 1245993 A2 * | 10/2002 | |
| EP | 1271221 A | 1/2003 | |
| JP | A 10-133159 | 5/1998 | |
| JP | B2 3088988 | 7/2000 | |
| WO | WO 99/09451 A | 2/1999 | |

\* cited by examiner

*Primary Examiner*—Rodney Bovernick
*Assistant Examiner*—Omar Rojas
(74) *Attorney, Agent, or Firm*—Oliff & Berridge, PLC

(57) ABSTRACT

An object of the invention is to provide an electrode system for optical modulation of an optical modulator to reduce a thickness "E" of an electrode required for velocity matching and for reducing a propagation loss in the electrode. A substrate 2 is made of an electrooptic material and has one and the other main faces 2a, 2b opposing each other. An electrode system 20A is provided on the substrate 2 for applying a voltage for modulating light propagating in optical waveguides 6A and 6B. The electrode system 20A includes ground electrodes 3A, 3B and a signal electrode 4. A ratio "W/G" of a width "W" of the signal electrode 4 to a gap "G" between the ground and signal electrodes is 0.8 or higher. Preferably, the substrate 2 has a thickness "T" of 20 μm or larger, in a region where the optical waveguides 6A and 6B are provided.

6 Claims, 8 Drawing Sheets

ELECTRODE SYSTEMS FOR OPTICAL MODULATION AND OPTICAL MODULATORS

This application claims the benefit of a Japanese Patent Application P2003-5291 filed on Jan. 14, 2003, the entirety of which is incorporated by reference.

BACKGROUND OF THE INVENTION

1. Field of the Invention

The present invention relates to an electrode system for optical modulation and an optical modulator.

2. Related Art Statement

A traveling-wave optical modulator using lithium niobate ($LiNbO_3$), lithium tantalate ($LiTaO_3$) or gallium-arsenide (GaAs) for the optical waveguide has excellent properties and may realize a broadband modulation at a high efficiency. Lithium niobate and lithium tantalate are excellent ferroelectric materials having large electrooptic coefficients and can control light within a short optical path. Factors suppressing the modulation frequency of the traveling-wave optical modulator include velocity mismatch, dispersion, electrode conductor loss and dielectric loss.

Such optical modulator has a relatively complex structure having a substrate, an optical waveguide, signal and ground electrodes, and a buffer layer. The dimensions of such elements have not necessarily been studied enough.

In a normal travelling wave type optical modulator made of lithium niobate has dimensions shown, for example, in FIG. 5. A pair of ground electrodes 3A, 3B and a signal electrode 14 are provided on a substrate 12 through a buffer layer 9. Optical waveguides 6A and 6B are provided between the ground electrodes 3A, 3B and signal electrode 14. For example, it is provided that the substrate 12 is made of lithium niobate single crystal and the thickness "T" of the substrate is made sufficiently large. In this case, it is possible to realize the velocity matching when the width "W" of the signal electrode is 8 μm, the gap "G" is 20 μm, the thickness "E" of the electrode is 18 μm and the thickness "B" of the buffer layer 9 made of $SiO_2$ is 1.3 μm. The product (Vπ·L) of the driving voltage Vπ and the length "L" of the electrode is, however, elevated to 20 Vcm, so that the resultant optical modulator requires a high driving voltage. Further, the propagation loss in the electrode due to conductor loss is as large as 0.32 dB/cm at 1 GHz.

The assignee filed Japanese patent publications 10-133, 159A and 2002-169, 133A, and disclosed a travelling wave optical modulator for giving the solution. The modulator has an optical waveguide substrate having a thinner portion with a thickness of 10 μm or smaller where the optical waveguide is formed. It is thereby possible to realize high-speed modulation without forming a buffer layer made of silicon dioxide, and to advantageously reduce the product "Vπ·L" of a driving voltage Vπ and a length "L" of an electrode.

SUMMARY OF THE INVENTION

In the optical modulator with a back groove described in 10-133, 159A, it is possible to reduce Vπ·L under the velocity matching condition. It is provided that, for example, a substrate made of lithium niobate is used. Vπ·L is 12 Vcm when the width "W" of the signal electrode is 30 μm, the gap "G" is 40 μm, the thickness "T" of the substrate is 13 μm, the thickness "E" of the electrode is 31 μm and the buffer layer 9 is not provided.

For attainting the velocity matching in the optical modulator, it is needed to increase the thickness "E" of the electrode to a value, for example, of 31 μm. It is, however, not easy to form a thick film having a desired shape at a high precision in a product, resulting in a reduction of the production yield.

An object of the invention is to provide a structure for an electrode system for optical modulation of an optical modulator to reduce a thickness "E" of an electrode required for velocity matching and for reducing a propagation conductor loss in the electrode.

The present invention provides an electrode system for optical modulation for applying a voltage for modulating light propagating in an optical waveguide. The electrode system is provided on a substrate having one and the other main faces opposing each other and made of an electrooptic material. The electrode system has ground and signal electrodes. A ratio "W/G" of a width "W" of the signal electrode to a gap "G" between the ground and signal electrodes is 0.8 or higher.

The present invention further provides an optical modulator having the above electrode system.

The inventors have found the importance of the ratio W/G of the width "W" of the signal electrode to the gap "G" between the ground and signal electrodes in the electrode system for an optical modulator as described above. Specifically, it was proved that the propagation conductor loss of the electrode can be reduced by elevating the ratio "W/G" to 0.8 or higher (by increasing the width "W" of the signal electrode with respect to the gap "G"). Further, it is found that the thickness "E" of the electrode and the driving voltage Vπ·L can be reduced at the same time under the velocity matching condition. It is, thus possible to improve the yield of manufacturing process of the electrode. Moreover, according to the present invention, it is possible to position the optical waveguide near the central (signal) electrode, so that the driving voltage Vπ·L can be further reduced.

These and other objects, features and advantages of the invention will be appreciated upon reading of the following description of the invention when taken in conjunction with the attached drawings, with the understanding that some modifications, variations and changes of the same could be easily made by the skilled person in the art.

PREFERRED EMBODIMENTS OF THE INVENTION

Figure 1:
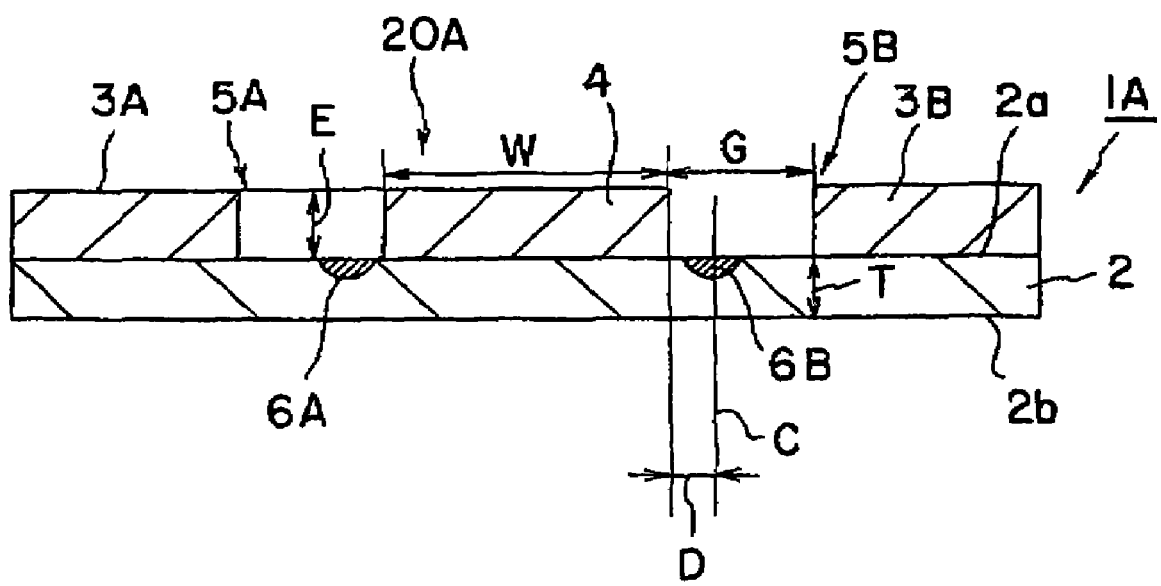
FIG. 1 is a diagram schematically showing an optical modulator 1A according to the present invention.

The invention will be further described referring to the attached drawings. FIG. 1 is a cross sectional view schematically showing an electrode system 20A for optical modulation and an optical modulator 1A according to one embodiment of the invention.

A substrate 2 is plate-shaped. Ground electrodes 3A, 3B and signal electrode 4 are formed on a first main face 2a of the substrate 2. It is applied a so called coplanar waveguide type electrode (CPW electrode) pattern in the present example. A pair of optical waveguides 6A and 6B are formed between the neighboring electrodes, so that a signal voltage is applied onto each optical waveguide in a direction substantially parallel with the main face. The optical waveguides 6A and 6B are of Mach-Zehnder type structure, which is well known and is not particularly illustrated.

According to the present invention, the ratio (W/G) of the width "W" of the signal electrode with respect to the electrode gap "G" is made 0.8 or higher. In other words, the width "W" of the signal electrode is made larger than that in a prior art with respect to "G". Although it is not clear why such design has not been studied in the art, it would be considered that the function of the modulator is not be substantially change by increasing the width of the signal electrode 4.

"W/G" may preferably be 1 or higher, and more preferably be 1.15 or higher, based on the viewpoint of the present invention. The upper limit of "W/G" is not particularly defined, and may be 5 for example.

Figure 2:
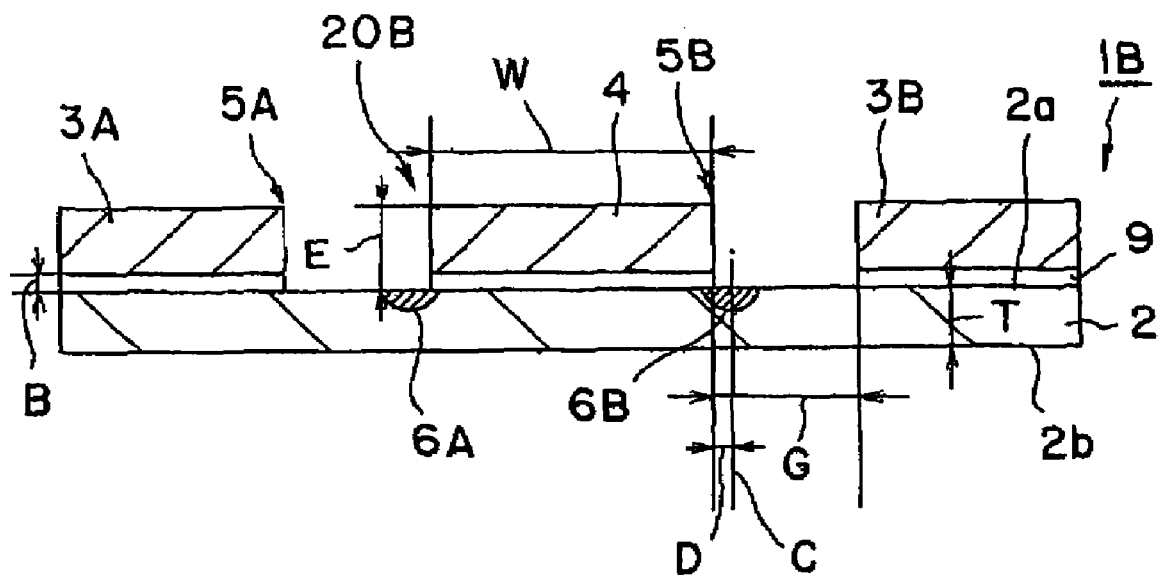
FIG. 2 is a diagram schematically showing an optical modulator 1B having a buffer layer 9, according to another embodiment of the present invention.

In a preferred embodiment, a buffer layer is formed between the substrate and electrodes. FIG. 2 shows an electrode system 20B for optical modulation and optical modulator 1B according to the present embodiment. A buffer layer 9 is formed on a main face 2a of the substrate 2. Ground electrodes 3A and 3B and signal electrode 4 are formed on the buffer layer 9.

Figure 3:
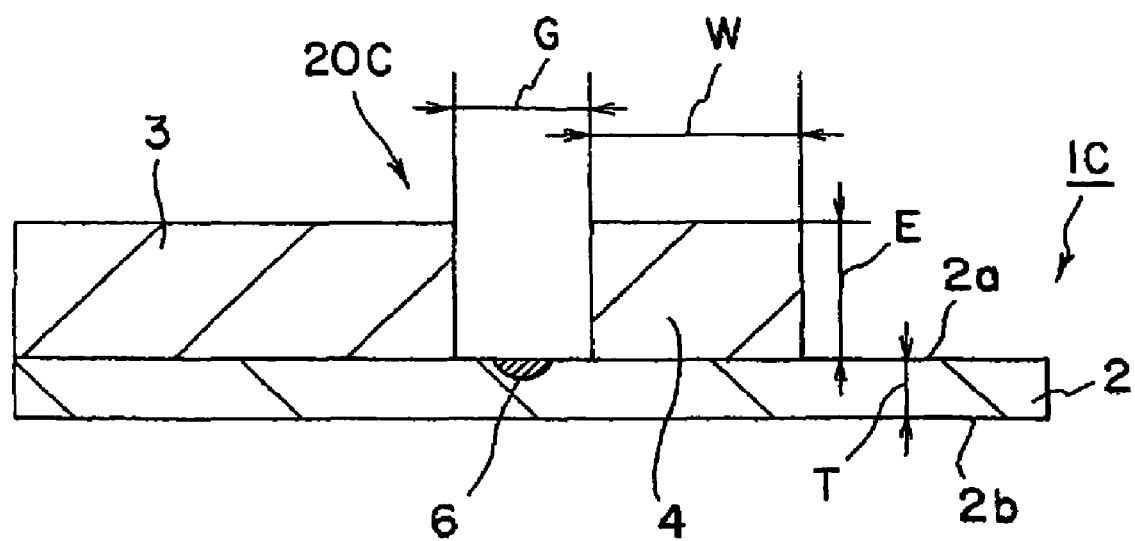
FIG. 3 is a diagram schematically showing an optical modulator 1C according to a still another embodiment of the present invention.

The present invention may be applied to an electrode system according to so called asymmetric coplanar strip line electrode pattern. FIG. 3 shows an electrode system 20C for optical modulation and an optical modulator 1C according to this embodiment. In the embodiment, a ground electrode 3 and signal electrode 4 are formed on a main face 2a of the substrate 2, according to so called asymmetric coplanar strip line electrode (A-CPS electrode) pattern. An optical waveguide 6 is formed between the adjacent electrodes, so that a signal voltage is applied on the optical waveguide 6 in a direction substantially parallel with the main face.

Figure 4:
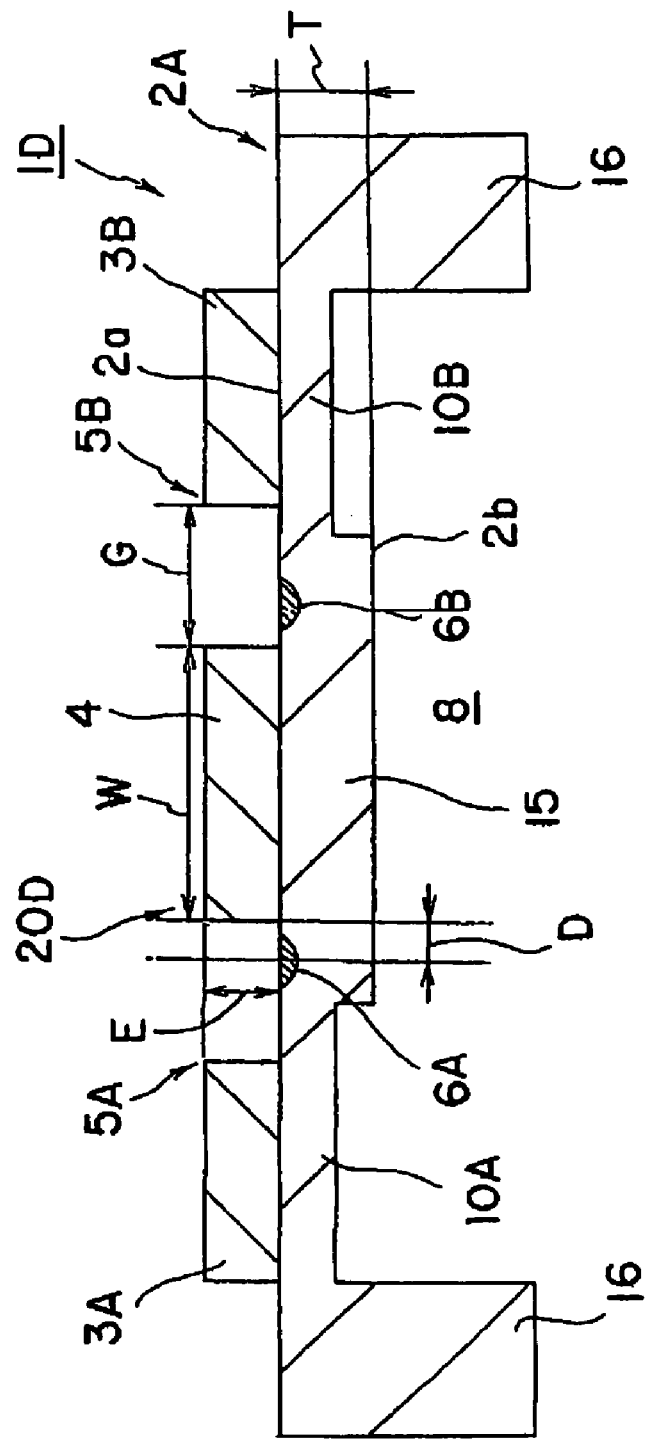
FIG. 4 is a diagram schematically showing an optical modulator 1D having a substrate 2 with first and second thinner portions formed therein, according to still another embodiment of the present invention.

Further, in a preferred embodiment, the substrate has a first thinner portion and a second thinner portion having a thickness smaller than that of the first thinner portion. The optical waveguide is provided in the first thinner portion. FIG. 4 is a diagram schematically showing an electrode 20D for optical modulation and an optical modulator 1D according to the embodiment.

A recess 8 is formed on the side of the bottom face 2b of the substrate 2A. Two second thinner portions 10A, 10B and one first thinner portion 15 face the, recess 8. The thinner portion 15 is formed between the first thinner portions 10A and 10B. A base portion 16 with a thickness larger than that of the thinner portion is provided outside of each of the thinner portions 10A and 10B.

The invention may be applied to a travelling wave optical modulator of so called independent modulation type.

On the viewpoint of the present invention, the electrode gap "G" is necessarily made smaller. The lower limit of the gap is, however, not particularly defined. The electrode gap "G" may preferably be 1 µm or more for preventing the short cut of the ground and signal electrodes. The gap "G" may preferably be 2 µm or larger for facilitating the formation of the optical waveguide in the gap.

The upper limit of the gap "G" is not also particularly defined, as long as the ratio "W/G" defined above is satisfied. In a preferred embodiment, the modulating electrodes are provided according to a coplanar type electrode pattern, and the gap "G" is 38 µm or smaller, and more preferably be 35 µm or smaller.

In another preferred embodiment, the modulating electrodes are provided according to so called an asymmetric coplanar strip line type electrode configuration, and the gap "G" is 19 µm or smaller and more preferably be 17.5 µm or smaller.

Figure 5:
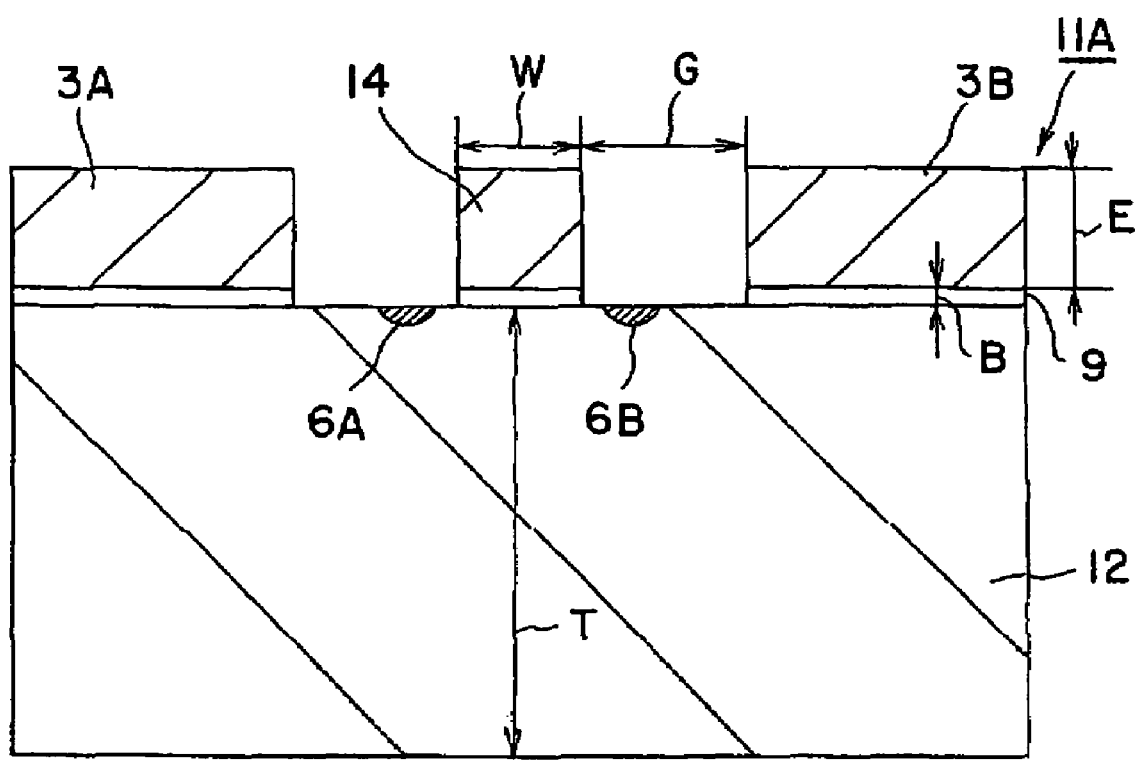
FIG. 5 is a diagram schematically showing an optical modulator 11A according to a comparative example.

In a preferred embodiment, the thickness "T" of the substrate is 20 µm or smaller in a region where the optical waveguide is formed. "W/G" is made larger according to the present invention. It is thus possible to reduce the propagation conductor loss of the electrode, to attain the velocity matching and to reduce the driving voltage at the same time, even when the thickness "T" of the substrate is 20 µm or smaller and the electrode thickness is small. It is now provided that the thickness "T" of the substrate is made large as shown in FIG. 5. In this case, the characteristic impedance is reduced to a value considerably lower than 50Ω and a thicker electrode may be required, when W/G is made larger. The present invention is thus most useful when the thickness "T" of the substrate is 20 µm or smaller.

Further in another embodiment of the present invention, as shown in FIG. 2, a buffer layer 9 is provided on the substrate 2, and the thickness "T" of the substrate is 40 µm or smaller in a region where the optical waveguide is formed. Also in this case, it is possible to reduce the propagation conductor loss of the electrode, to attain the velocity matching and to reduce the driving voltage at the same time, by elevating W/G according to the present invention. In the present embodiment, the buffer layer is provided on the substrate, so that the upper limit of a preferred range of the substrate thickness "T" is increased to 40 µm.

In a preferred embodiment, the thickness "E" of the signal electrode is 30 µm or smaller and more preferably be 20 µm or smaller. The thickness of the signal electrode may preferably be 1 µm or larger for assuring electrical conductivity in the electrode.

In a preferred embodiment, the distance "D" of the end of the signal electrode and the optical axis of the optical waveguide is G/3 or smaller. The advantages will be further described. It was proposed to shift the position of the optical waveguide toward the central electrode 4 for reducing the driving voltage (Japanese patent publication 2002-169, 133A). When the optical waveguides 6A and 6b are moved toward the signal electrode 4 in a structure having a small width "W" of the signal electrode 4, the distance of the two optical waveguides 6A and 6B is made considerably small. Since the optical waveguides 6A and 6B constitute a Mach-Zehnder type modulator, they may function as a directional coupler if the distance of the optical waveguides 6A and 6B is made small. According to the present invention, however, the width "W" of the signal electrode 4 is larger. It is thus possible to maintain a distance of the optical waveguides 6A and 6B at a value for avoiding the coupling between the waveguides. It is thus possible to provide an optical modulator having a considerably low driving voltage. In this case, it is preferred to provide a buffer layer between the substrate and electrodes to prevent an increase of the propagation loss in the optical waveguide caused by approaching the optical waveguides toward the electrode metal.

The substrate is made of an electrooptic material having ferroelectricity and may preferably be made of a single crystal. Such crystal is not particularly limited as far as it is effective for light modulation, and includes lithium niobate, lithium tantalate, and lithium niobate-lithium tantalate solid solution, potassium lithium niobate, KTP, GaAs and quartz. Single crystals of lithium niobate, lithium tantalate and lithium niobate-lithium tantalate solid solution are particularly preferred.

Each of the ground and signal electrodes may be made of a material not particularly limited so long as it has a low resistance and excellent impedance property, including gold, silver, copper or the like.

The buffer layer may be made of any known material such as silicon dioxide, magnesium fluoride, silicon nitride and alumina.

The optical waveguide is formed in or on the substrate and may preferably be formed on the side of the first main face of the substrate. The optical waveguide may be a ridge type optical waveguide directly formed on the first main face of the substrate, or a ridge type optical waveguide formed on another layer on the first main face of the substrate. Alternatively, the optical waveguide may be an optical waveguide formed by inner diffusion process such as titanium diffusion process, or an optical waveguide produced by ion exchange process such as proton exchange. The electrode may be on the side of the first main face of the substrate as described above. Alternatively, the electrode may be directly formed on the first main face of the substrate, or may be formed on the buffer layer on the main face.

In the substrate, the polarization axis of the crystal may preferably be substantially parallel with the first main face (surface) of the substrate. In this embodiment, it is preferred an X-cut or Y-cut plate of lithium niobate, lithium tantalate or lithium niobate-lithium tantalate solid solution. FIGS. 1 to 4 show examples where the main body is of the X-cut or Y-cut plate.

Alternatively, in another preferred embodiment, the polarization axis of crystal is substantially perpendicular to the first main face (surface) of the substrate. In this embodiment, it is preferred a Z-cut plate made of lithium niobate, lithium tantalate or lithium niobate lithium tantalate solid solution. When a Z-cut plate is used, it is necessary to provide the optical waveguide just under the electrode. Since such configuration tends to increase the propagation loss of light, a buffer layer may preferably be provided between the first main face of the substrate and electrode for reducing the propagation loss.

In the invention, the substrate may be joined with a separate supporting body. The material for the supporting body may preferably be a material having a dielectric constant lower than that of the electrooptic material, for minimizing the influence of the supporting body on the propagating velocity of microwave signal. Such material includes a glass such as quartz glass or the like.

The optical waveguide substrate and supporting body may be joined with a method not particularly limited. In a preferred embodiment, they are joined with an adhesive agent. In this case, the refractive index of the adhesive agent may preferably be lower than that of the electrooptic material constituting the substrate. In addition to this, the dielectric constant of the adhesive agent may preferably be lower than that of the electrooptic material constituting the substrate.

The adhesive includes an epoxy adhesive, a thermal setting type adhesive, an ultraviolet curable adhesive, and a ceramic adhesive having a thermal expansion coefficient near that of the electrooptic material such as lithium niobate, for example "ALON CERAMICS C" (manufactured by Toa Gosei Co., Ltd. And having a thermal expansion coefficient of $13 \times 10^{-6} K$.).

EXAMPLES (Production)

Figure 6:
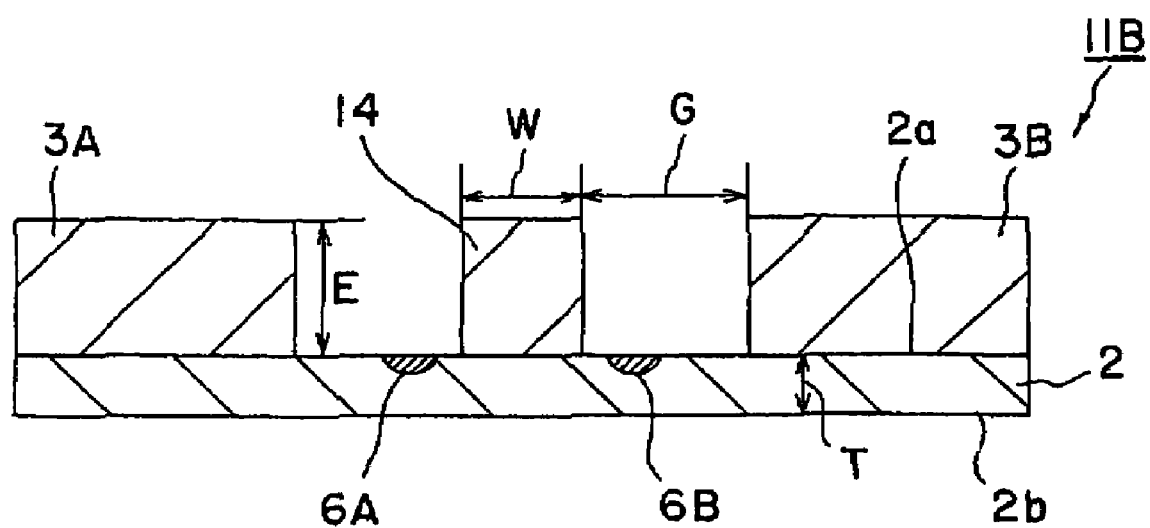
FIG. 6 is a diagram schematically showing an optical modulator 11B according to a comparative example.

Each of the optical modulators 1A, 11A and 11B, shown in FIGS. 1, 5 and 6, respectively, was produced. A substrate made of an X-cut 3-inch wafer (lithium niobate single crystal) was used. The optical waveguides 6A, 6B of Mach-Zehnder type were formed by titanium diffusion process and photolithography on the surface of the wafer. The size of each optical waveguide 6A or 6B was, for example, 10 µm at $1/e^2$. CPW electrodes were formed by electroplating.

A resist film was coated onto the first main face (surface) of the wafer-shaped bulk for the substrate and the bulk was set on a surface plate of lithium niobate with a thermosetting resin. The bottom face 2b of the substrate was polished with horizontal grinding, high speed lapping and polishing (CMP). The thickness of the substrate is adjusted to a predetermined value by measuring with a profilometer.

A sheet of an epoxy thermosetting resin having a thickness of 50 µm was interposed between the substrate 2 and a supporting body, and heated at 80° C. to cure the sheet. The thus generated joining layer joins the substrate 2 and supporting body with each other. The wafer was then removed from the surface plate and washed with an organic solvent to remove stick wax thereon. The wafer was then cut with a dicing saw working machine to obtain each optical modulator chip. Each chip is optically polished at the end faces of the optical waveguide.

(Results of Simulation)

Detailed simulation was performed for each of the optical modulators of FIGS. 1, 5 and 6 by means of FEM. Dimensions of the elements were searched for satisfying an effective refractive index for microwave of 2.15 and a characteristic impedance of about 45Ω. The thus calculated dimensions were shown in FIG. 1. The calculation (simulation) was performed based on an article [Estimation of frequency response for high-speed $LiNbO_3$ optical modulators] (O. Mitomi et al.) on [IEE Proceedings Optoelectronics] Vol. 146, No2, pp.99–104, April, 1999.

TABLE 1

|  | Comparative example 1 (FIG. 5) | Comparative Example 2 (FIG. 6) | Example 1 (FIG. 1) |
|---|---|---|---|
| Thickness T of substrate (µm) |  | 13 | 13 |
| Width W of signal electrode 4, 14 (µm) | 8 | 30 | 100 |
| Electrode gap G (µm) | 20 | 40 | 40 |
| W/G | 0.4 | 0.75 | 2.5 |
| C (µm) | 10 | 10 | 10 |

TABLE 1-continued

|  | Comparative example 1 (FIG. 5) | Comparative Example 2 (FIG. 6) | Example 1 (FIG. 1) |
|---|---|---|---|
| Thickness B of buffer layer (μm) | 1.3 | None | None |
| Thickness E of electrode (μm) | 18 | 31 | 13 |
| Effective refractive index for microwave | 2.15 | 2.15 | 2.15 |
| Characteristic impedance (Ω) | 46 | 46 | 45 |
| Vπ·L (Vcm) | 20 | 12 | 12 |
| Propagation conductor loss in electrode at 1 GHz (dB/cm) | 0.32 | 0.15 | 0.12 |

The optical modulator according to the comparative example 1 has a sufficiently larger thickness "T" as shown in FIG. 5. The width of the signal electrode 14 was 8 μm, the electrode gap "G" was 20 μm, and W/G was 0.4. Under the condition, the velocity matching and desired characteristic impedance were realized at an electrode thickness of 18 μm. Under the condition, however, the propagation conductor loss in the electrode was increased and the Vπ·L was as high as 20 Vcm.

The optical modulator 11B according to the comparative example 2 shown in FIG. 6 was used. The thickness of the substrate was 13 μm, the width of the signal electrode 14 was 30 μm, the electrode gap "G" was 40 μm, and W/G was 0.75. Under the condition, the velocity matching and desired characteristic impedance were realized at an electrode thickness of 31 μm. Under the condition, the propagation conductor loss in the electrode was reduced and the Vπ·L was reduced to 12 Vcm. The electrode thickness of 31 μm was required for satisfying the above velocity matching condition and characteristic impedance. It is difficult to manufacture the electrode film having such a large thickness at a high precision and yield.

The optical modulator 1A according to the inventive example 1 shown in FIG. 1 was used. The thickness "T" of the substrate was 13 μm, the width "W" of the signal electrode 14 was 100 μm, the electrode gap "G" was 40 μm; and W/G was 2.5. Under the condition, the velocity matching and desired characteristic impedance were realized at an electrode thickness of 13 μm. Under the condition, the propagation loss in the electrode was reduced and the Vπ·L was reduced to 12 Vcm.

The optical modulator having a shape shown in FIG. 1 was produced as described above, except that the electrode gap "G" was adjusted at 25 or 40 μm, so that W/G was variously changed. The thickness "E" of the electrode required for the velocity matching and the propagation conductor loss in the electrode were calculated. Dimensions of the elements were calculated when the thickness of the substrate was 13 μm, the effective refractive index for microwave was 2.15 and the characteristic impedance was about 45Ω. The results were shown in FIGS. 7 and 8.

Figure 7:
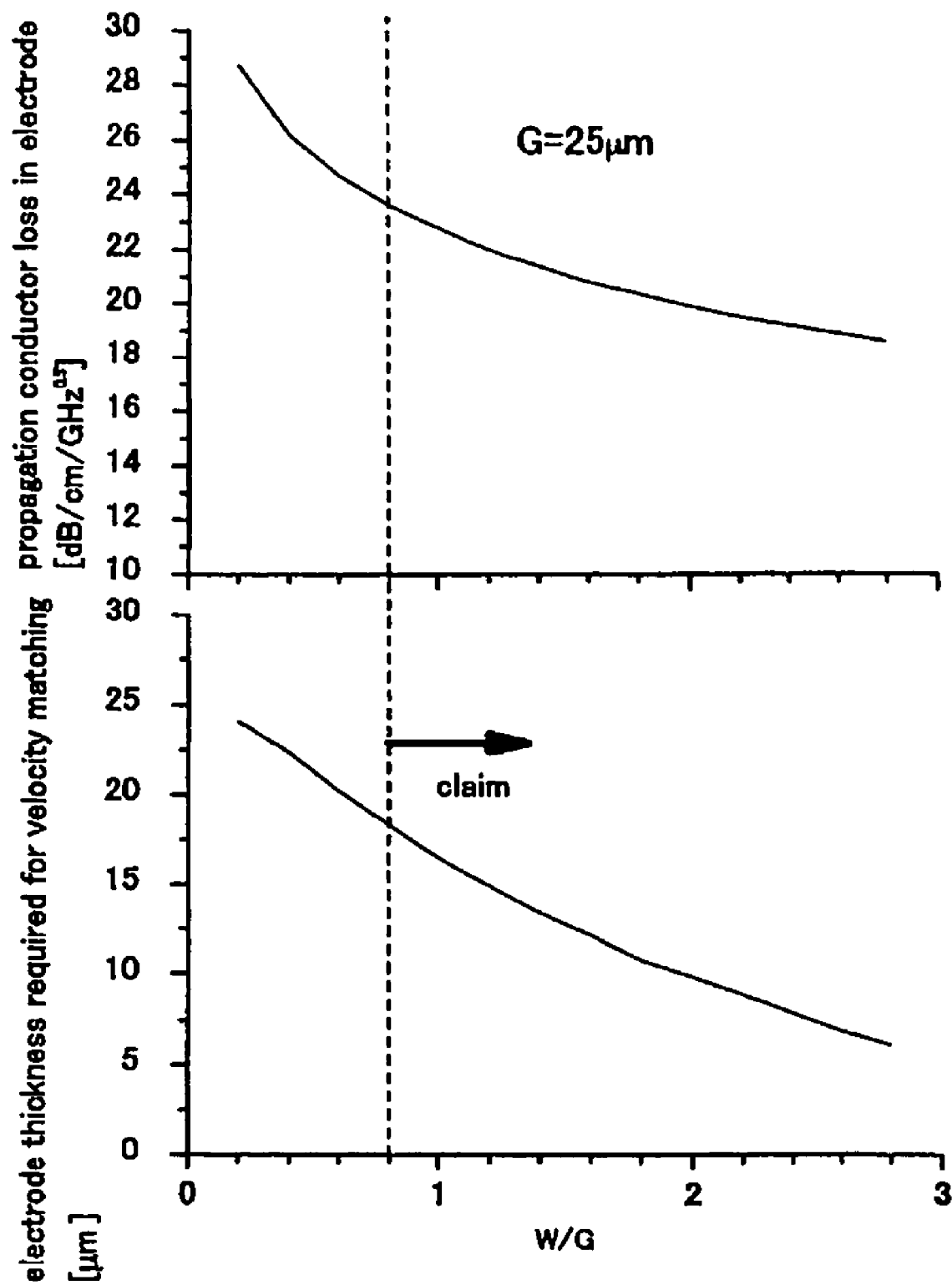
FIG. 7 is a graph showing the relationship of "W/G", an electrode thickness required for velocity matching and electrode conductor loss, provided that the electrode gap "G" is 25 μm.
Figure 8:
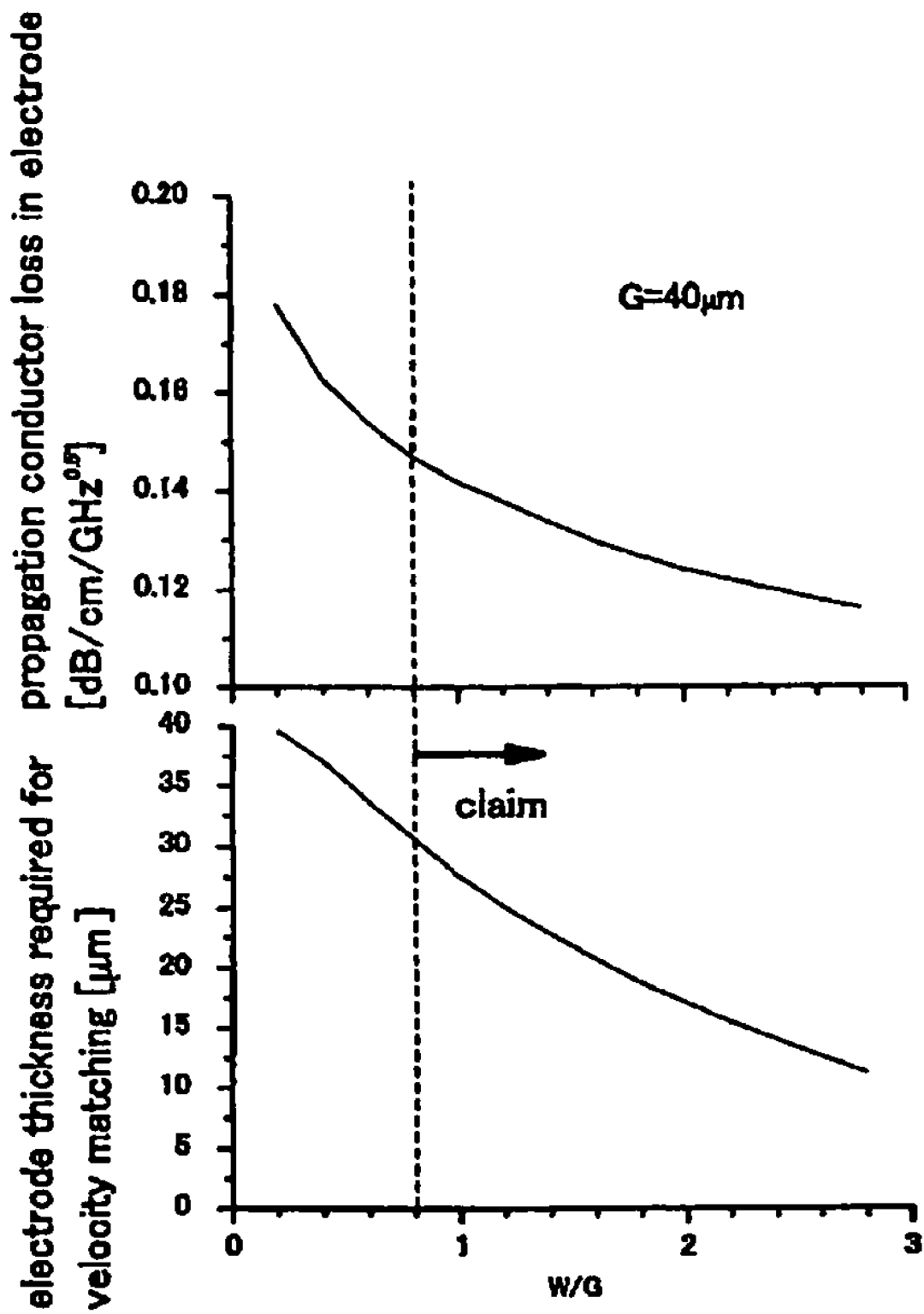
FIG. 8 is a graph showing the relationship of "W/G", an electrode thickness required for velocity matching and electrode conductor loss, provided that the electrode gap "G" is 40 µm.

As can be seen from FIGS. 7 and 8, the propagation conductor loss in the electrode and the thickness "E" of the electrode required for the velocity matching can be considerably reduced by increasing W/G to 0.8 or higher.

As described above, the present invention provides an electrode system in an optical modulator for considerably reducing the propagation conductor loss in the electrode and the thickness "E" of the electrode required for the velocity matching.

The present invention has been explained referring to the preferred embodiments, however, the present invention is not limited to the illustrated embodiments which are given by way of examples only, and may be carried out in various modes without departing from the scope of the invention

The invention claimed is:

1. An electrode system for optical modulation for applying a voltage for modulating light propagating in an optical waveguide; said electrode system being provided on a substrate comprising one and other main faces opposing each other and made of an electrooptic material:
    said electrode system provided according to a coplanar-type electrode pattern, said electrode system comprising a ground electrode and a signal electrode, wherein a ratio "W/G" of a width "W" of said signal electrode to a gap "G" between said ground and signal electrodes is in a range of 2.5 to 5, said substrate has a thickness "T" of 20 μm or smaller in a region of said substrate where said optical waveguide is formed, said signal electrode has a thickness of less than 15 μm, and said substrate comprising an X-cut plate of a single crystal of lithium niobate;
    wherein:
        a buffer layer is not provided on the substrate; and
        the gap "G" is less than 25 μm.

2. The electrode system of claim 1, wherein said substrate comprises a first thinner portion and a second thinner portion having a thickness smaller than that of said first thinner portion, and wherein said optical waveguide is provided in said first thinner portion.

3. An electrode system for optical modulation for applying a voltage for modulating light propagating in an optical waveguide; said electrode system being provided on a substrate comprising one and other main faces opposing each other and made of an electrooptic material:
    said electrode system provided according to a coplanar-type electrode pattern, said electrode system comprising a ground electrode and a signal electrode, wherein a ratio "W/G" of a width "W" of said signal electrode to a gap "G" between said ground and signal electrodes is in a range of 1.15 to 5, said substrate has a thickness "T" of 20 μm or smaller in a region of said substrate where said optical waveguide is formed, said signal electrode has a thickness of 20 μm or smaller, and said substrate comprising an X-cut plate of a single crystal of lithium niobate;
    wherein:
        a buffer layer is not provided on the substrate;
        the gap "G" is 38 μm or smaller; and
        a distance "D" between the end of said signal electrode and the optical axis of said optical waveguide is G/3 or smaller.

4. An optical modulator comprising:
    a substrate having one and other main faces opposing each other and made of an electrooptic material;
    an optical waveguide including an electrode system provided according to a coplanar-type electrode pattern, said electrode system comprising:
        a ground electrode and a signal electrode, wherein a ratio "W/G" of a width "W" of said signal electrode to a gap "G" between said ground and signal electrodes is in a range of 2.5 to 5, and said substrate has a thickness "T" of 20 μm or smaller in a region of said substrate where said optical waveguide is formed, said signal electrode has a thickness of less than 15 μm, said substrate comprising an X-cut plate of a single crystal of lithium niobate, and said optical waveguide comprising a coplanar waveguide pattern;

wherein:

a buffer layer is not provided on the substrate; and the gap "G" is less than 25 μm or smaller.

5. The optical modulator of claim 4, wherein said substrate comprises a first thinner portion and a second thinner portion having a thickness smaller than that of said first thinner portion, and wherein said optical waveguide is provided in said first thinner portion.

6. An optical modulator comprising:

a substrate having one and other main faces opposing each other and made of an electrooptic material;

an optical waveguide including an electrode system provided according to a coplanar-type electrode pattern, said electrode system comprising:

a ground electrode and a signal electrode, wherein a ratio "W/G" of a width "W" of said signal electrode to a gap "G" between said ground and signal electrodes is in a range of 1.15 to 5, and said substrate has a thickness "T" of 20 μm or smaller in a region of said substrate where said optical waveguide is formed, said signal electrode has a thickness of 20 μm or smaller, said substrate comprising an X-cut plate of a single crystal of lithium niobate, and said optical waveguide comprising a coplanar waveguide pattern;

wherein:

a buffer layer is not provided on the substrate;

the gap "G" is 38 μm or smaller; and a distance "D" between the end of said signal electrode and the optical axis of said optical waveguide is G/3 or smaller.

* * * * *